(12) United States Patent
Privitera et al.

(10) Patent No.: US 7,776,110 B2
(45) Date of Patent: Aug. 17, 2010

(54) AGGLOMERATED ANIMAL LITTER

(75) Inventors: Marc P. Privitera, Walnut Creek, CA (US); Christina M. Borgese, San Ramon, CA (US); David J. Lestage, Livermore, CA (US); Robert J. Iliff, Pleasanton, CA (US); Donald Swatling, Oakland, CA (US); Gregory van Buskirk, Danville, CA (US)

(73) Assignee: The Clorox Company, Oakland, CA (US)

( * ) Notice: Subject to any disclaimer, the term of this patent is extended or adjusted under 35 U.S.C. 154(b) by 652 days.

(21) Appl. No.: 11/766,358

(22) Filed: Jun. 21, 2007

(65) Prior Publication Data

US 2008/0318762 A1   Dec. 25, 2008

(51) Int. Cl.
*C01B 33/32* (2006.01)
(52) U.S. Cl. .................................. 23/313 AS; 23/313 R
(58) Field of Classification Search ............. 23/313 AS, 23/313 R
See application file for complete search history.

(56) References Cited

U.S. PATENT DOCUMENTS

| | | | |
|---|---|---|---|
| 3,765,371 A | 10/1973 | Fisher | |
| 4,275,684 A | 6/1981 | Kramer et al. | |
| 4,315,761 A | 2/1982 | Larrson et al. | |
| 4,437,429 A | 3/1984 | Goldstein et al. | |
| 4,560,527 A | 12/1985 | Harke et al. | |
| 4,677,086 A | 6/1987 | McCue et al. | |
| 4,685,420 A | 8/1987 | Stuart | |
| 4,828,721 A | 5/1989 | Bollier et al. | |
| 4,866,023 A | 9/1989 | Ritter et al. | |
| 5,000,115 A | 3/1991 | Hughes | |
| 5,079,201 A | 1/1992 | Chu et al. | |
| 5,094,189 A | 3/1992 | Aylen et al. | |
| 5,129,365 A | 7/1992 | Hughes | |
| 5,169,307 A | 12/1992 | Frye | |
| 5,176,107 A | 1/1993 | Buschur | |
| 5,188,064 A | 2/1993 | House | |
| 5,230,305 A | 7/1993 | House | |
| 5,303,676 A | 4/1994 | Lawson | |
| 5,325,816 A | 7/1994 | Pattengill et al. | |
| 5,329,880 A | 7/1994 | Pattengill et al. | |
| 5,359,961 A | 11/1994 | Goss et al. | |
| 5,361,719 A | 11/1994 | Kiebke | |
| 5,386,803 A | 2/1995 | Hughes | |
| 5,389,325 A | 2/1995 | Bookbinder et al. | |
| 5,458,091 A | 10/1995 | Pattengill et al. | |
| 5,469,809 A | 11/1995 | Coleman | |
| 5,534,057 A | 7/1996 | Harrison et al. | |
| 5,538,932 A | 7/1996 | Yan et al. | |
| 5,597,617 A | 1/1997 | DeLiso et al. | |
| 5,609,123 A | 3/1997 | Luke et al. | |
| 5,638,770 A | 6/1997 | Peleties | |
| 5,735,232 A | 4/1998 | Lang et al. | |
| 5,836,263 A | 11/1998 | Goss et al. | |
| 5,975,019 A | 11/1999 | Goss et al. | |
| 6,030,565 A | 2/2000 | Golan | |
| 6,194,065 B1 | 2/2001 | Golan | |
| 6,216,634 B1 | 4/2001 | Kent et al. | |
| 6,287,550 B1 | 9/2001 | Trinh et al. | |
| 6,405,677 B2 | 6/2002 | McPherson et al. | |
| 6,405,678 B2 | 6/2002 | Ikegami et al. | |
| 6,472,343 B1 | 10/2002 | McCrae et al. | |
| 6,499,984 B1 | 12/2002 | Ghebre-Sellassie et al. | |
| 6,572,920 B1 | 6/2003 | Eitan et al. | |
| 6,573,212 B2 | 6/2003 | McCrae et al. | |
| 6,676,754 B1 | 1/2004 | Fleming et al. | |
| 6,696,384 B2 | 2/2004 | McCrae et al. | |
| 6,740,632 B1 | 5/2004 | Jacob et al. | |
| 6,894,018 B1 | 5/2005 | Beimesch et al. | |
| 2001/0047769 A1 | 12/2001 | McPherson et al. | |
| 2001/0049514 A1 | 12/2001 | Dodge, II et al. | |
| 2002/0007800 A1 | 1/2002 | Ochi et al. | |
| 2002/0014209 A1 | 2/2002 | Bloomer | |
| 2003/0148100 A1 | 8/2003 | Greene et al. | |
| 2004/0079293 A1 | 4/2004 | Rasner et al. | |
| 2004/0112297 A1 | 6/2004 | Rasner et al. | |
| 2005/0005869 A1 | 1/2005 | Fritter et al. | |

FOREIGN PATENT DOCUMENTS

| | | |
|---|---|---|
| EP | 0573303 A1 | 12/1993 |
| JP | 2001252547 | 9/2001 |
| JP | 2004121036 A | 4/2004 |
| WO | WO02/060496 | 8/2002 |

*Primary Examiner*—Edward M Johnson
(74) *Attorney, Agent, or Firm*—Ann Lee

(57) ABSTRACT

Lightweight composite particles, primarily comprising various bentonite clays, but which may include other functional solid particles, are formed by introducing expanding gases or air into the particle forming process. The methods presented create the ability to reduce the bulk density of the composite particles while maintaining and in some cases even increasing the particle strength.

20 Claims, No Drawings

AGGLOMERATED ANIMAL LITTER

FIELD OF THE INVENTION

A method of forming an agglomerated animal litter is presented for providing light-weighting and structural integrity benefits.

BACKGROUND OF THE INVENTION

Existing animal litters, particularly feline litters, are partially successful in reducing the malodor of solid waste by the combined actions of 1) desiccating the waste, 2) absorbing odors, and 3) providing odor masking agents. A major improvement to the litter system would be to lighten the weight of the litter so that it less expensive for the manufacturer to ship and less heavy for the end user to carry.

SUMMARY OF THE INVENTION

Gas, whether created in situ, or added as a dispersion, forces the individual particles which make up a composite particle(s) to separate without destruction or disconnection in order to create a porosity within the composite particles. The porosity created results in composite particles (or an agglomerate) which has a lower bulk density than would normally be created by using only surface to surface agglomerate formation methods.

An aspect of the invention includes an agglomeration method for forming reduced bulk density (RDB) composites suitable for use as an animal litter comprising the steps of: (a) providing particles of an absorbent material suitable for use as an animal litter with a particle size ranging from 150 μm-5 mm; (b) providing moisture; (c) agglomerating the particles of absorbent material to form bonds between the individual particles of absorbent material, the bonds having moisture present in the interstitial spaces thereof, and (d) introducing a gas during the agglomeration step to form composites having reduced bulk densities and increased particle strength.

Another aspect of the invention includes an agglomeration method for forming reduced bulk density (RDB) composites suitable for use as an animal litter comprising the steps of: (a) providing particles of bentonite clay with a particle size ranging from 150 μm-5 mm; (b) at least one performance-enhancing active; (c) providing moisture; (d) agglomerating the particles to form bonds between the individual particles of bentonite and performance-enhancing active, the bonds having moisture present in the interstitial spaces thereof, and (e) introducing a gas during the agglomeration step to form composites having reduced bulk density and increased particle strength.

A further aspect of the invention includes an agglomeration method for forming reduced bulk density (RDB) composites suitable for use as an animal litter comprising the steps of (a) providing particles of a bentonite clay with a particle size ranging from 150 μm-5 mm; (b) providing particles of at least one performance-enhancing active; (c) providing moisture; (d) agglomerating the bentonite and particles of at least one performance-enhancing active to form bonds between the individual particles of clay and active, the bonds having moisture present in the interstitial spaces thereof, and (e) introducing a gas during the agglomeration step to form composites having reduced bulk density and increased particle strength.

DETAILED DESCRIPTION OF THE INVENTION

Before describing the present invention in detail, it is to be understood that this invention is not limited to particularly exemplified systems or process parameters as such may, of course, vary. It is also to be understood that the terminology used herein is for the purpose of describing particular embodiments of the invention and is not intended to limit the scope of the invention.

All publications, patents and patent applications cited herein, whether supra or infra, are hereby incorporated by reference in their entirety to the same extent as if each individual publication, patent or patent application was specifically and individually indicated to be incorporated by reference.

It must be noted that, as used in this specification and the appended claims, the singular forms "a," "an" and "the" include plural referents unless the content clearly dictates otherwise. Thus, for example, reference to an "odor controlling agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

All numbers expressing quantities of ingredients, constituents, reaction conditions, and so forth used in the specification and claims are to be understood as being modified in all instances by the term "about". Notwithstanding that the numerical ranges and parameters setting forth the broad scope of the subject matter presented herein are approximations, the numerical values set forth in the specific examples are reported as precisely as possible. All numerical values, however, inherently contain certain errors necessarily resulting from the standard deviation found in their respective testing measurements.

The following description includes embodiments presently contemplated for carrying out the present invention. This description is made for the purpose of illustrating the general principles of the present invention and is not meant to limit the inventive concepts claimed herein.

Definitions

As is generally accepted by those of ordinary skill in the animal litter art, the following terms have the following meanings.

As used herein particle size refers to sieve screen analysis by standard ASTM methodology (ASTM method D6913-04e1).

As used herein, the terms "scoopable" and "clumping litter" refer to a litter that agglomerates upon wetting such that the soiled portion (aka "urine clump") can be removed from the litter box leaving the unsoiled portion available for reuse.

As used herein the term "absorbent material suitable for use as an animal litter" refers to the many liquid-absorbing materials and combinations thereof known to those having ordinary skill in the art. Examples of absorbent materials suitable for use as an animal litter include those materials identified as such in any Patent or Published Patent Application.

Examples of commonly used materials include clays, such as kaolinite and bentonite (e.g., sodium bentonite and calcium bentonite); organic materials such as straw, sawdust, wood, paper, and cellulose; and silica gels. The absorbent particles may range in particle size from about 150 μm to about 5 mm (4-100 mesh) and can represent raw materials or composite particles.

As used herein the term "composite particle" means a particle formed by combining smaller discrete particles of either the same composition or different compositions such that the resulting particle, i.e., the "composite particle", is a particle having structural integrity that is of a particle size bigger than that of its component parts. The composite particles useful for animal litter can range in particle size between about 150 μm and about 5 mm and are typically between about 350 μm and about 3 mm. As used herein the term "composite particle(s)" and the term "composite(s)" are synonymous.

As used herein the term "composite blend" refers to a dry mixing of the composite particles of the present invention and one or more additional absorbent litter materials and/or other litter additives or the dry mixing of composite particles having different compositions, and/or combinations thereof.

As used herein the terms "litter additives" or "other materials suitable for use as litter additives" refer to performance-enhancing actives as described herein as well as other additives known to be used in litter compositions by those having ordinary skill in the art.

As used herein the term "performance-enhancing active" refers to a material that when present causes the litter composition to exhibit specific characteristics including but not limited to improved odor control, lower density (light-weighting agents), easier scooping, better particle/active consistency, higher clump strength, lower cost, etc. Illustrative materials for the performance-enhancing active(s) include but are not limited to antimicrobials, odor absorbers, odor inhibitors, binders, fragrances, health indicating materials, nonstick release agents, superabsorbent materials, light-weighting minerals, filler materials and combinations thereof. Performance-enhancing actives may comprise between 0-50% of the litter composition. In some cases where the performance-enhancing active is a particularly strong substance, it may be present in only about 0.001%

As used herein the term "reinforcing fiber material(s)" means any solid material having a mean cylindrical shape and a length to diameter aspect ratio greater than one that helps to maintain the structural integrity of litter clumps once formed. The fibers may range in particle size from about 1 nm to about 5 mm.

As used herein the term "activated carbon" means absorbent carbon-based materials, including activated and reactivated carbon-based absorbents. Activated carbon, including the material commonly called activated charcoal, is an amorphous form of carbon characterized by high adsorptivity for many gases, vapors and colloidal solids. Carbon is generally obtained by the destructive distillation of coal, wood, nutshells, animal bones or other carbonaceous materials, including coconuts. The carbon is typically "activated" or reactivated by heating to about 800-900° C., with steam or carbon dioxide, which results in a porous internal structure. The internal surfaces of activated carbon typically average about 10,000 square feet per gram. Surface area in absorptive carbons is typically measured by a test called BET-Nitrogen, and measures the extent of the pore surfaces within the matrix of the activated carbon. BET-Nitrogen is used as a primary indicator of the activity level of the carbon, based on the principle that the greater the surface area, the higher the number of adsorptive sites available. It is believed that carbons having a BET number greater than 500 will provide odor control equivalent to PAC at concentration levels equal to or less than those disclosed herein as effective for PAC.

As used herein the term "filler materials" refer to materials that can be used as the absorbent material, but are generally ineffective at liquid absorption if used alone. Therefore these materials are generally used in combination with other absorbent materials to reduce the cost of the final litter product. Illustrative examples of filler materials include limestone, sand, calcite, dolomite, recycled waste materials, zeolites, and gypsum.

Foaming Agglomeration

Numerous surface to surface agglomerate (aka composite particle) formation processes are known for the production of animal litter and are described, for example, in the following US Patents and US Patent Applications, which are hereby incorporated by reference: U.S. Pat. No. 5,647,300; U.S. Pat. No. 5,775,259; U.S. patent application Ser. No. 10/618,401 filed Jul. 7, 2003; U.S. patent application Ser. No. 11/119,204 filed Apr. 29, 2005; and US Provisional Patent Application 60/805,007 filed Jun. 16, 2006. Generally speaking, some moisture, typically in the form of water, is added to the process.

A light-weight clay agglomerate litter that optionally includes performance-enhancing actives can be formed by using the physical properties associated with an expanding gas. The gas, which can be created in situ or added as a dispersion, creates more porous composite particles (aka agglomerate) that have lower bulk densities than would normally be created by using only surface to surface agglomerate formation methods. Hereinafter, the more porous composites will be referred to as the "Reduced Bulk Density Composites" or "RBD Composites".

During a typical agglomeration process, the agglomerated particles are held together by particle to particle bonds, i.e., bridge bonds. To create the RBD Composites of the present invention, a gas is introduced into agglomerating clay particles, which creates a separation force as the gas expands and fills the interstitial spaces between the particles. The separation force stretches the bridge bonds and creates more space between the particles. The forces required to create bridge bonds and retain those bridge bonds are balanced against the separation force exerted by the gas, such that the cohesive strength of the composite particles are retained. This balance between the binding force of the particles and the separation force of the expanding gas correlates to the resulting particles' bulk density and particle strength. Particle strength as used herein refers to the attrition resistance of the agglomerated particles.

In addition to RBD, the composite particles formed using the physical properties associated with an expanding gas also have increased particle strength. By increased particle strength, it is meant that the composite particles are less susceptable to attrition than would normally be created by using only surface to surface agglomerate formation methods.

One method employs the use of gas releasing reactions, such as the water-activated combination of sodium bicarbonate and citric acid. The reaction creates carbon dioxide gas which generates the force required to separate the particles without destruction or disconnection of the bridge bonds.

Another method employs the use of heat to convert the moisture present (trapped) in the interstitial spaces of the bridge bonds to gas, generating a similar expanding force. Typically the moisture comprises water, but may contain another substance as well.

A third method employs the use of a substance that changes the surface tension of the moisture in the interstitial spaces of the bridge bonds, i.e., a "foaming agent". Some examples include common industrial surfactants, such as amine oxides, alkyl polyglucosides, ethoxylated alcohols, etc. Upon high shear agitation, air is entrained in the trapped moisture creating the necessary expansion force as described in the previous two methods.

The use of a surfactant that is solid at room temperature, but is liquid at an elevated temperature, would also entrain air as described above.

A fourth method employs the use of various ionic species, some of which would include calcium ion, potassium ion, chloride ion, and others, to increase the ionic strength of the solution, which increases the binding force available between the bridge bonds. The increased binding force would be used to counteract the expansion force generated by the expanding gas forces, creating the ability to control the bulk density and strength of the particle.

Solid particles, such as performance-enhancing additives, that are present in the litter composition may have an affect on the bridge bond mechanisms and resulting particle characteristics. Other solid particles in the Composites may include: carbon, titanium dioxide, sodium polyacrylate, silver nitrate, magnesium sulfate, and other like functional particles.

Any combination of the four base mechanisms can be used to control the desired resulting particles properties. For example, the combination of a gas releasing reaction with a heat releasing reaction may be used. The expansion force is activated in situ to control the rate and volume of expansion, thus controlling the expansion force relative to time. The external heat increases the evaporation rate of the moisture, which cures the bridge bonds between the particles at the same time that the particles are subjected to the expanding force created by the gas releasing reaction. Thus, allowing for better control over the desired bulk density and particle strength of the resulting RBD Composites.

RBD Agglomerates that contain performance-enhancing actives could be engineered such that the active release rate and efficacy of the active relative to the surface area created by the expanding gas method could be optimized. For example, the levels of performance-enhancing actives could be minimized as the above methods maximize porosity, surface area, and particle strength.

EXAMPLE 1

The Ambient Temperature Method

One method starts with a nominal temperature mixture of non reactive solid components in water. The water level is such to produce a flowable slurry and many different ratios are possible depending upon the mass ratios of the non-reactive solids. An amount, as little as 1% to as much as 50% of solid citric acid (or any solid acid), is added to the slurry to acidify the mixture. A stochiometric amount of a suitable solid base (e.g., sodium bicarbonate), is added at a known rate. The rate should be suitable to control the first order kinetics of the acid base reaction that generates the gas and expands the slurry. Heat is applied to drive off the excess water and to cure the expanding and drying slurry. The cure is controlled by adjusting the amount of heat added to the slurry to produce a dry mass. The resulting mass is then separated into particles and is ready for use.

A second conjugate method begins by forming a basic slurry and then adding acid to produce the gas necessary for expansion. In this conjugate method, a suitable base is first added to the mixture of non-reactive solids in water. Then, the basic slurry is acidified to create a similar result as described above.

Alternatively, sodium bicarbonate can be dry-blended with bentonite clay. A partially neutralized polyacrylate binder can be added during the agglomeration. The use of the binder avoids the need for an acidic reactant. Because the binder intimately mixes with the agglomerating clay, it helps set the expanded agglomerates, thus enhancing particle strength.

EXAMPLE 2

The Ambient Temperature High Shear Method

Similar to the Ambient Temperature Method discussed above, the Ambient Temperature High Shear Method begins with a mixture containing non-reactive solids in water. A foaming agent is added (a typical example is a surface acting agent) and the mixture is whipped using a high shear, high contact, high speed agitator to entrain air in the mix thus expanding the slurry. Heat is applied to cure the particle bridge bonds, and the agglomerates are then classified and ready for use. The preferred size range is around 0.42 to 1.7 mm (12/40 mesh).

In one embodiment of laboratory scale (which can be scaled up according to engineering practices known to those skilled in the art), a mixing vessel is set up with a wire whisk similar to that used in preparing cake batter. Water and optionally a foaming agent are added to the mixer. Air is added by rapidly agitating the mixture and whipping it to a "froth". Bentonite powder is added while whipping. One problem encountered is that the foam tends to collapse and the wet bentonite mud begins to pack into the spaces between the mixing vessel wall and the wire whisk. A foam layer forms under the whisk. The product is dried in an oven to drive off excess water.

In another embodiment of laboratory scale (which can be scaled up according to engineering practices known to those skilled in the art), a mixing vessel is set up with a wire whisk similar to that used in preparing cake batter. Bentonite powder is added to a container until it is about even with the level of the wire whisk. Water is added to where the mixture resembles mud. Once a thick "sap" or "paste" is formed, the whisk speed is accelerated to allow aeration of the wet clay to occur. As with cake batter, the mud tends to pack on the mixer walls with a foamy layer in the middle. The foamed material is removed and dry bentonite is added and the mixture, ball-milled and classified.

EXAMPLE 3

The High Shear Molten Non Acid Base Method

The High Shear Molten Non Acid Base Method is similar to the Ambient Temperature Method. This method also begins with a mixture containing non-reactive solids in water. Heat is added to the foaming agent (e.g., a surfactant) to reduce its viscosity to below 100 cps. The heated surfactant is then whipped to entrain air and solid particles (e.g., bentonite or other absorbent material) are added to the whipped mixture. Bridge bonds between the solid particles are initiated and cured by additional heat. Particles are classified and made ready for use. The preferred size range is around 0.42 to 1.7 mm (12/40 mesh).

In one embodiment of laboratory scale (which can be scaled up according to engineering practices known to those skilled in the art), a mixing vessel is set up with a wire whisk similar to that used in preparing cake batter. About 1% of L24/22 or similar room temperature solid surfactant is added and heated until liquid. Water is added and the mixture whipped to a "froth". Bentonite powder is added, whipped in air and cooled. The product is then heated to drive off excess water. The foamed material is removed, ball-milled and classified.

For example, various ionic species could be added during the agglomeration process. When sodium bentonite is the primary clay source, adding multi-valent ions (e.g., $CaCl_2$ dissolved in water) while the clay is in a tumbling environment (e.g., pan agglomerator, drum agglomerator or pin mixer), will allow some of the sodium ions in the sodium bentonite clay to be exchanged for calcium ions. This rapid exchange creates a "precipitate bridge" that remains intact after drying which creates particles having both increased strength and porosity.

Sodium Bentonite is commonly used as a clumping animal litter because it swells upon wetting. Sodium bentonite, as well as some other clays having a high Sodium Adsorption Ratio, are called Sodic Clays. Sodic clays have high dispersibility: mono-valent, mobile sodium cations balance negative clay platelets and both can freely disassociate upon contact with water. The clay platelets tend to come apart and migrate to areas of high moisture which impairs the hydroconductivity of the clay by creating a highly viscous layer that is fully satiated with respect to moisture content. Thus, clay that is further removed from the point where the liquid was introduced is less accessible because it is blocked by the moisture-saturated viscous layer.

Surprisingly and with great utility, it has been discovered that dissolving multi-valent ions (e.g., calcium or magnesium chloride) at low levels in the liquid applied to the powdered clay during the agglomeration process can create RBD composites of good strength, size, shape, and perhaps most importantly, improved porosity. Currently, porosity and strength (two highly desired features), are considered to be mutually exclusive. However, the process of incorporating multi-valent ions imparts hydroconductivity into the agglomerating clay which improves both the porosity and strength of the dried RBD composites.

An additional benefit is that incorporating multi-valent ions into the agglomerating process as described simplifies the manufacturing process because there is little need to separate or recycle feed materials during agglomeration.

The flocculating phenomena of applying dissolved multi-valent ions greatly improves processability while imparting functional benefits to the resultant composite particles. The embedded ions act as a fixative providing both an increase in binding strength and a more uniform classifying effect.

Additionally, the incorporation of multi-valent ions displayed a two-fold benefit by creating an unexpected synergy between product performance and processing ease. The continuous staging of equipment permits the addition of liquids and solids at multiple points during the agglomeration process. The building of clay-based RBD composites is best achieved within some type of rotating device that provides a rounding effect as the smaller clay particles encounter liquid droplets and grow in size. The inventors have found that it is undesirable to bring the materials in the agglomerator to a homogeneous composition by allowing back mixing. If back mixing occurs, all the material in the agglomerator will rapidly coalesce into a tacky mass, and stick aggressively to the walls of the equipment. Attempts to recover the materials as smaller bodies by adding clay with lower moisture fail because at the moisture level needed for good agglomeration, the clay involved is still capable of swelling further. Thus, the problem is that the large mass will not quickly equilibrate within the drum because it is too viscous to be mixed.

This problem has been overcome by creating a moisture gradient along the length of the agglomerator through a series of spray nozzles. These nozzles enable the tacky transition to occur at the exit of the agglomerator, greatly reducing build-up. Adhesion of the wetted clay to the walls of the equipment is reduced because the dissolved ions in the spray help form stronger and more porous agglomerates by inducing cohesion within the formed composites. The solution currently employed to avoid the adhesion of wetted clay to the agglomerator walls is to allow back mixing. In the instant case, designing the agglomerator to overcome the adverse properties of the wetted clay was counterintuitive because the solution was to intentionally limit back mixing.

It has been observed that excess water in the agglomerator can destroy foam production. It has also been observed that a surfactant is sometimes necessary to start the foaming mechanism.

EXAMPLE 4

The Phase Change Dry Heat Method

Similar to the Ambient Temperature Method, a dry mix is made. Heat of varying intensity is added using various methods.

For example, in one embodiment, moisture can be added to absorb into the particle to create bonds and displace air in the interstitial space. As the moisture is heated and converted to steam, it expands the interstitial spaces and develops the same force balance as described above. The heat can be added using direct and indirect methods. The intensity of the heat concentrated in the expanding particle is balanced with the amount of liquid penetration in the particle.

In another embodiment, a shift in the phase change temperature to below nominal room temperature allows the use of this method's mechanism using liquid nitrogen or liquid carbon dioxide as the phase changing liquid as these would both displace the interstitially trapped air and then be available for expansion force as the liquid gasified with additional heat.

In yet another embodiment, a high velocity nozzle system could also induce the phase change due to the differential in pressure experienced by the slurry at the nozzle exit. The mechanism is the same, event though the devices to create the phase change are varied.

The incorporation of the various formula components and the affects on the binding force and expanding force balance can be broadened and developed consistent with this disclosure. The measurement of the forces are by indirect methods and use the resulting particle strength, bulk density, and ingredient concentrations as control mechanisms.

Combining steps or adding additional steps could eliminate the need of external heat to cure the particle and/or eliminate any size classification step.

"Foaming" systems that are common to nonwovens and spray drying operations could increase the effectiveness of the methods that use expanding gas(es). The limit of each functional particle's concentration at which the binding mechanism weakens could be determined such that the expanding force destroys the forming particle. Using surface disturbance avoidance methods could be used to insure that the formed "foam" does not collapse prior to curing the agglomerates.

Usage as an animal litter requires the composite particles to form larger agglomerates (clumps) upon point of use activation, as well as low attrition (dust creation) at point of use. The binding strength created in the composite can not preferentially create attraction to the mammalian tissue in which it would be in contact (for example, feline paw pads or feline fur).

Lightweight bentonite and other functional active particles would enable lightweight animal litter and drive cost savings due to shipping. Increased surface reaction area would reduce the functional active levels required for the same consumer function efficacy at the point of use. The control of the binding force balance in the particle would reduce attrition due to manufacturing and logistic system handling and would reduce the levels of dust presented and/or created at the point of consumer use.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

We claim:

1. An agglomeration method for forming reduced bulk density (RDB) composites suitable for use as an animal litter comprising the steps of:
    (a) providing particles of an absorbent material suitable for use as an animal litter with a particle size ranging from 150 μm-5 mm;
    (b) providing moisture;
    (c) agglomerating the particles of absorbent material to form bonds between the individual particles of absorbent material, said bonds having moisture present in the interstitial spaces thereof, and
    (d) introducing a gas during the agglomeration step to form composites having reduced bulk density and increased particle strength.

2. The agglomeration method recited in claim 1, wherein the step of introducing gas occurs via a gas releasing reaction.

3. The agglomeration method recited in claim 2, wherein the gas releasing reaction comprises contacting at a predetermined rate a weak base with a weak acid such that upon contact, gas is released.

4. The agglomeration method recited in claim 3, wherein the weak base and weak acid are present in stochiometric amounts.

5. The agglomeration method recited in claim 3, wherein the weak base is sodium bicarbonate, calcium carbonate, or combinations thereof and the weak acid is citric acid.

6. The agglomeration method recited in claim 1, further comprising the step of:
    (e) introducing heat, wherein the heat initiates the step of introducing a gas by converting the moisture to gas.

7. The agglomeration method recited in claim 1, further comprising the steps of:
    (e) providing a substance that changes the surface tension of the moisture;
    (f) agglomerating the substance that changes the surface tension of the moisture along with the particles of absorbent material suitable for use as an animal litter; and
    (g) using high shear agitation to entrain air in the moisture to introduce the gas.

8. The agglomeration method recited in claim 7, wherein the substance that changes the surface tension of the moisture is a surfactant.

9. The agglomeration method recited in claim 8, wherein the surfactant is a solid at room temperature, but is a liquid at an elevated temperature.

10. The agglomeration method recited in claim 9, wherein the surfactant comprises amine oxides, alkyl polyglucosides, ethoxylated alcohols and combinations thereof.

11. The agglomeration method recited in claim 1, further comprising:
    (e) providing at least one ionic species in the moisture to increase the ionic strength thereof, wherein the binding force of the bonds is increased.

12. The agglomeration method recited in claim 11, wherein the ionic species comprises calcium ions, potassium ions, chloride ions, and mixtures thereof.

13. An agglomeration method for forming reduced bulk density (RDB) composites suitable for use as an animal litter comprising the steps of:
    (a) providing particles of a bentonite clay with a particle size ranging from 150 μm-5 mm;
    (b) providing particles of at least one performance-enhancing active;
    (c) providing moisture;
    (d) agglomerating the bentonite and particles of at least one performance-enhancing active to form bonds between the individual particles of clay and active, said bonds having moisture present in the interstitial spaces thereof, and
    (e) introducing a gas during the agglomeration step to form composites having reduced bulk density and increased particle strength.

14. The agglomeration method recited in claim 13, wherein the at least one performance-enhancing active is activated carbon.

15. The agglomeration method recited in claim 13, further comprising the steps of:
    (e) providing a surfactant to change the surface tension of the moisture;
    (f) agglomerating the surfactant along with the particles of clay and performance-enhancing active; and
    (g) using high shear agitation to entrain air in the moisture to introduce the gas.

16. The agglomeration method recited in claim 13, further comprising the steps of:
    (e) providing a surfactant that is a solid at room temperature, but is a liquid at an elevated temperature to change the surface tension of the moisture;
    (f) agglomerating the surfactant along with the particles of clay and performance-enhancing active; and
    (g) adding heat during the agglomeration step to change the phase of the surfactant from solid to liquid thereby entraining air in the moisture.

17. An agglomeration method for forming reduced bulk density (RDB) composites suitable for use as an animal litter comprising the steps of:
    (a) providing particles of bentonite clay with a particle size ranging from 150 μm-5 mm;
    (b) at least one performance-enhancing active;
    (c) providing moisture;
    (d) agglomerating the particles to form bonds between the individual particles of bentonite and performance-enhancing active, said bonds having moisture present in the interstitial spaces thereof; and
    (e) introducing a gas during the agglomeration step to form composites having reduced bulk density and increased particle strength.

18. The agglomeration method recited in claim 17, wherein the step of introducing gas occurs via a gas releasing reaction.

19. The agglomeration method recited in claim 18, wherein the gas releasing reaction comprises contacting at a predetermined rate a weak base with a weak acid such that upon contact, gas is released.

20. The agglomeration method recited in claim 3, wherein the weak base and weak acid are present in stochiometric amounts.

* * * * *